Figure 1:
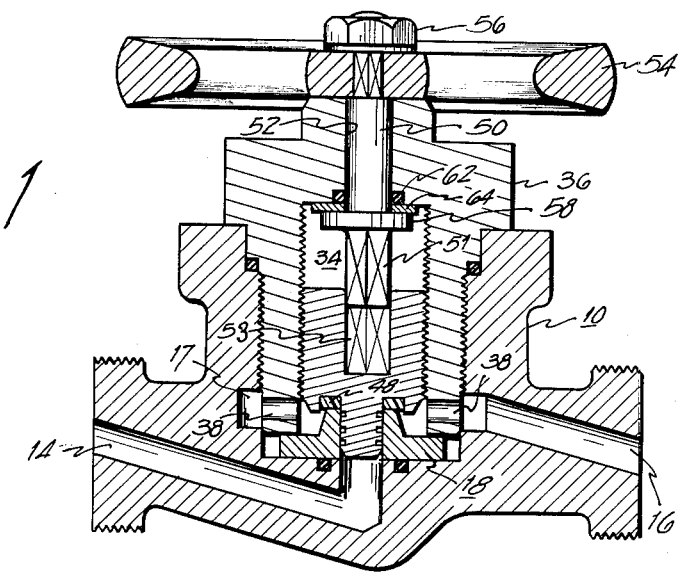

Oct. 23, 1962   F. E. KNECHT ET AL   3,059,894
VALVE MEMBER FOR HIGH PRESSURE VALVE
Filed Nov. 1, 1960

Forrest E. Knecht
Eli Schwartz
Ross Berry Nicholas, Jr.
Anthony Baker

INVENTORS

BY

*Arthur L. Collins*

ATTORNEY

United States Patent Office 3,059,894
Patented Oct. 23, 1962

3,059,894
VALVE MEMBER FOR HIGH PRESSURE VALVE
Forrest E. Knecht, Newfield, N.J., and Eli Schwartz, Philadelphia, Ross Berry Nicholas, Jr., Chester, and Anthony Baker, Media, Pa., assignors to the United States of America as represented by the Secretary of the Navy
Filed Nov. 1, 1960, Ser. No. 66,679
1 Claim. (Cl. 251—121)
(Granted under Title 35, U.S. Code (1952), sec. 266)

The invention described herein may be manufactured and used by or for the Government of the United States of America for governmental purposes without the payment of any royalties thereon or therefor.

This invention relates to valves and particularly to an improved hand-operated valve for controlling fluid under high pressure, for instance six thousand pounds per square inch, as found in missile ejecting systems.

In the usual devices used for the purpose, a disk-like valve member is provided with a packing in its end face. With closing of the valve, the packing is compressed between the valve member and an annular seat to prevent the escape of fluid. The packing, which is also a disk, extends across the aperture of fluid passage in the valve seat and is thus exposed to the pressure controlled. The packing is normally a non-metallic resilient material, as nylon, although a compressible metal, babbitt, may also be used.

In situations where a fluid from a high pressure source is suddenly admitted into the inlet side of the valve, a tremendous impact force and high heat are produced. The effect of these on a closed valve is to deform, melt, and/or burn the packing, whether it is non-metallic or metallic. A packing so damaged does not provide a proper seal and a leaking valve results.

If the valve is cracked open, which is a slight opening of it, at the time the high pressure fluid enters the valve, then, although the effect of the impact force is not as great, the packing is nevertheless damaged with radial scoring from the erosive and other destructive action of the fluid issuing between the packing and valve seat. Likewise, the packing is similarly damaged if an attempt is made to use the valve to throttle the fluid by cracking it open even after the pressure already had entered the inlet and had been under confinement by the valve.

With this in mind, it is an object of this invention to provide a valve and seat assembly for high pressure fluids on which the packing is normally not exposed to the action of high pressure fluid suddenly admitted to the valve and is moved to a position of relative safety with regard to the orifice through which fluid issues, when the valve is cracked open, so as to protect the packing.

It is another object of this invention to provide a hand-operated shut-off valve having a minimum of friction under all pressures which will meter the fluid at a reduced pressure and thereby avoid creating radial grooves in the packing when the valve is initially being opened.

A further object of the invention is to provide the valve member of a valve with a piston-like projection for insertion into the fluid aperture of a valve seat to absorb the forces and temperature rise of fluid admitted into the valve to thereby protect the packing.

Figure 2:
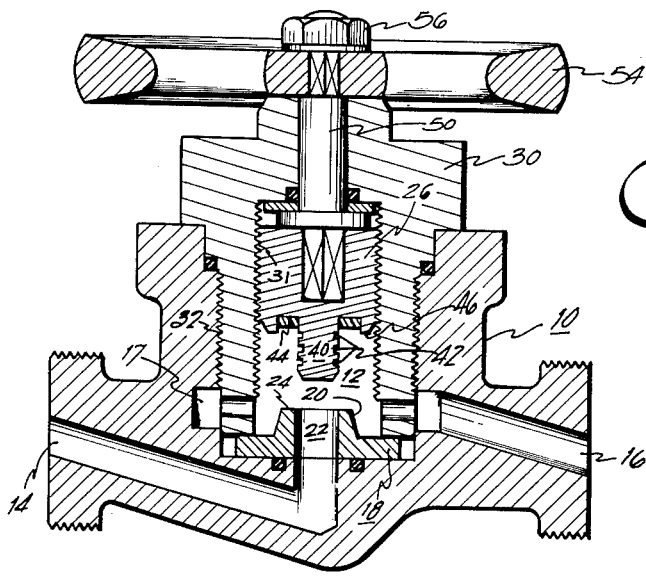

Other objects will become apparent upon reading the following description of a preferred embodiment of the invention with reference to the accompanying drawing in which FIGURE 1 is a longitudinal sectional view of a valve in the closed position and embodying the features of the invention;

FIGURE 2 is a similar view showing the valve fully open.

The valve illustrated comprises a body 10 having a vertical, threaded bore 12 which opens to the top of the valve body and is closed at the bottom. An inlet passage 14 enters upwardly from the bottom of bore 12; an outlet 16 penetrates its side near the bore's bottom and is intersected by an annular groove 17 in the cylindrical wall defining bore 12.

Disposed in the valve body bore 12 over the inlet opening is an annular valve seat element 18 which is slightly less in diameter than bore 12. It has a frusto-conical rim 20 which extends axially upwardly and is penetrated with an inlet opening 22 which forms a continuation of the inlet passageway. The rim 20 has a flat end face or seat 24 made of a suitably hard metal, for instance, Monel, that is adapted to be seated with a valve member 26, that will be described hereafter.

The valve seat element 18 is held in position by a cap or bonnet 30 which is a tube provided with inner and outer threads 31 and 32, respectively. It is closed at the top and screws down into the valve body bore 12. When in place, the surface at the bonnet's open end abuts the valve element 18 and clamps it to the bottom of the valve bore; the rim of the valve element extends into the bore 34 of the bonnet. The length of the bonnet 30 is such that it has its capped end extending above the valve body 10. Flats 36 are formed at the capped end by which turning of the bonnet is facilitated. Radial holes 38, two of which are shown, penetrate the bonnet's wall near its lower end to complete the passage to the outlet 16 from the inlet 14 by way of the bonnet's bore 34 and the valve body's annular groove 17.

The valve member 26 is a metal plug, which is threaded on its outer peripheral surface for screwing into the bonnet bore 34. It should be noted that the threads on the bonnet are oppositely turned, in order that the valve member 26 may be turned relative the bonnet without unscrewing the bonnet when it is necessary to open the valve.

A cylindrical projection or piston 40 extends axially from the lower end of the valve member 26 which is adapted to enter the inlet aperture 22 in valve seat element 18. The diameter of the projection or piston 40 is such that it snugly fits the aperture. With a one-half inch aperture, a clearance of one one-thousandth of an inch between the piston and the wall defining the aperture was found to produce the desired results.

The free end of the piston 40 is chamfered so that the piston may easily be guided into valve seat aperture 22 and it is provided with a plurality of spaced peripheral grooves, 42, on its outer surface, three of which are shown.

When positioned in valve seat aperture 22, piston 40 substantially closes it. It absorbs the impact force of fluid suddenly admitted from a high pressure source (not shown) to the valve and serves as a shield to dissipate the heat created. The grooves, 42, on the other hand, act as pressure reducing chambers. Fluid leaking passed piston 40 is progressively dropped in pressure with each groove it enters, since a certain amount of expansion takes place within them.

Contiguous to piston 40, the lower end of valve member 26 is provided with an annular recess 44 having a larger diameter than that of valve seat rim 20. One wall of recess 44 is defined by an axially extending annular skirt 46. An annular packing is carried within the recess 44 which may be a material with a high degree of resilience and a rigidity which will avoid cuts from valve seat 24. In this embodiment, it takes the form of a square shouldered nylon ring 48. The packing 48, retained within recess 44 by any conventional means and adapted to cooperate with valve seat 24, has a thickness slightly less than the depth of recess 44, i.e., the end wall or lip of skirt 46 extends slightly beyond the lower face of the nylon ring. This additional length of skirt 46 provides a means of preventing radial extrusion of the packing through tightening of the valve member 26 on valve seat element 18.

Valve member 26 is moved between its positions, closed (FIG. 1) and opened (FIG. 2), by screwing it up and down bonnet bore 34. A valve stem 50 passing through an aperture 52 in the top of bonnet 30 is provided for this purpose. On its outer end, stem 50 has a handwheel 54 which is secured by a nut 56 and disposed on the closed end of bonnet 30; at its lower end, a non-circular portion 51 is formed for coupling with valve member 26. Non-circular portion 51 is received in a conformingly shaped socket 53 but does not reach the full depth of the socket when valve member 26 is closed. Axial or sliding movement between the stem and valve member is thus permitted.

Stem 50, though rotatable, is held against axial movement relative bonnet 30 by spaced abutments provided by handwheel 54 and a collar 58 secured to the stem and disposed just under the bonnet's closed end. Leakage around stem 50 through the bonnet is prevented by an O-ring 62, which is held in place by a retaining ring 64.

In assembling the parts, the valve seat element 18 is deposited over the inlet passage 14, the valve member 26 is screwed into bonnet 30, and the latter threaded into valve body 10. Alignment of parts is assured by turning down the valve member into its seating position before bonnet 30 is fully tightened. The chamfered piston 40 of the valve member guides and holds the valve element 18 in its exact location which may be maintained by fully tightening the bonnet 30 so as to clamp the valve element in place.

From the description given, it is apparent that piston 40 is in effect a closure for inlet 14 which absorbs the action of the fluids admitted into the valve. The packing 48 is at the shoulder end of the piston 40 and exposed to fluid pressures only after they have gone by piston 40 and which are reduced by the piston grooves 42.

The packing 48 is moved to a protected position with opening of the valve, since, as viewed in FIGURE 2, it is moved to a considerable height above valve seat element 18 before piston 40 is fully withdrawn from the element, which is the full open position.

Obviously various changes may be made by those skilled in the art without departing from the spirit of the invention. It is therefore not intended to limit the invention otherwise than as defined in the following claim.

What is claimed is:

A valve comprising a body having a bore opened at the top and closed at the bottom, an axial inlet opening in the bottom of said bore, an outlet in a side thereof, and an annular groove in the wall defining said bore and intersecting said outlet; a valve seat element in said bore surrounding said inlet being of smaller size than said bore to permit shifting laterally for alignment thereof; a hollow bonnet in said bore secured to said body, said bonnet being closed at the top and having its lower end inserting into said bore only to engagement with said valve seat element, said latter element having a rim extending into said bonnet defining an annular seat around said inlet and being of smaller size than the bore of said bonnet throughout its entire extension, said bonnet having an aperture for connecting said inlet to said annular groove; a valve member threaded in said bonnet adapted for axial movement toward and away from said seat; a projection axially extending from said valve member for entering said inlet and closing thereof with movement of said member and having spaced annular grooves in the peripheral surface thereof; said valve member having an annular packing recess contiguous to the shoulder of said projection of larger diameter than said annular seat; and a packing element in said packing recess of less thickness than the depth of said packing recess.

References Cited in the file of this patent

UNITED STATES PATENTS

| 1,439,444 | Pendergast | Dec. 19, 1922 |
| 2,181,059 | Lee | Nov. 21, 1939 |

FOREIGN PATENTS

| 59,843 | Norway | of 1938 |
| 162,594 | Austria | Mar. 10, 1949 |
| 496,770 | Italy | of 1954 |